United States Patent [19]

Graves

[11] Patent Number: 4,955,658
[45] Date of Patent: Sep. 11, 1990

[54] AUTOMOBILE FOOT REST

[75] Inventor: Lee K. Graves, Bloomfield Hills, Mich.

[73] Assignee: Wickes Manufacturing Company, Southfield, Mich.

[21] Appl. No.: 399,148

[22] Filed: Aug. 28, 1989

[51] Int. Cl.⁵ ............................................. B60N 3/06
[52] U.S. Cl. .................................... 296/75; 296/97.23
[58] Field of Search ............................ 296/75, 97.23; 180/90.6, 78; 74/560; 248/157

[56] References Cited

U.S. PATENT DOCUMENTS

| | | | |
|---|---|---|---|
| 3,047,088 | 7/1962 | Murrell | 296/75 |
| 3,059,960 | 10/1962 | Komorowski et al. | 296/65 |
| 3,288,239 | 11/1966 | Ristau | 180/78 |
| 3,487,715 | 1/1970 | Straus | 180/90.6 |
| 3,860,284 | 1/1975 | Lichtig | 296/75 |
| 4,778,216 | 10/1988 | Stupakis | 248/157 |

FOREIGN PATENT DOCUMENTS 634937 1/1962 Canada .

Primary Examiner—Robert R. Song
Attorney, Agent, or Firm—David A. Greenlee

[57] ABSTRACT

An adjustable foot rest for an occupant of an automobile has a floor board, comprising an inflatable bladder mounted on the floor board, a foot pad mounted on the chamber for engagement by the occupant's foot, and mean for variably inflating the bladder to selectively position the foot pad. The inflating means comprises a source of compressed air, air distribution means including a valve for selectively connecting the chamber to the source and to atmosphere, and control means controlling operation of the valve to selectively position the foot pad. The inflatable bladder has a plurality of flexible chamber arranged in accordion fashion to enable substantially linear movement of the foot pad between extreme inflated and deflated positions. The foot pad and bladder are imbedded in a carpet cutout in the floor board for movement of the foot pad between a deflated position substantially flush with the carpet surface and a fully inflated position substantially displaced above the carpet surface.

15 Claims, 2 Drawing Sheets

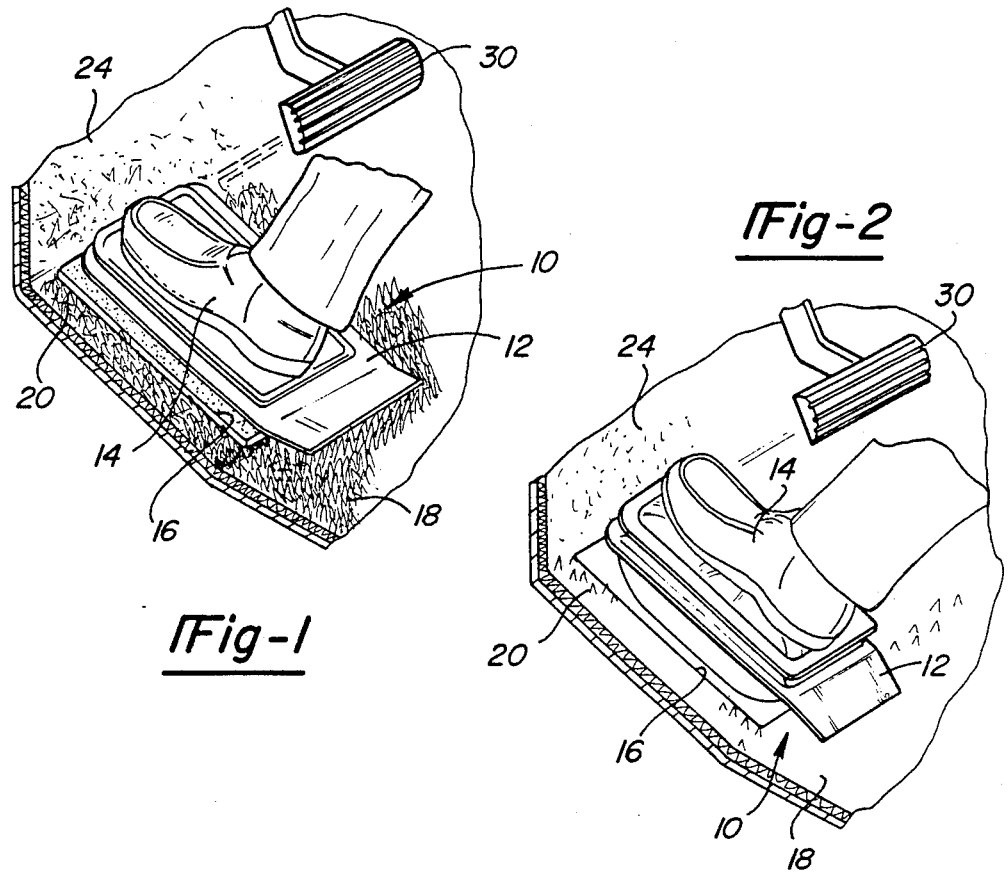
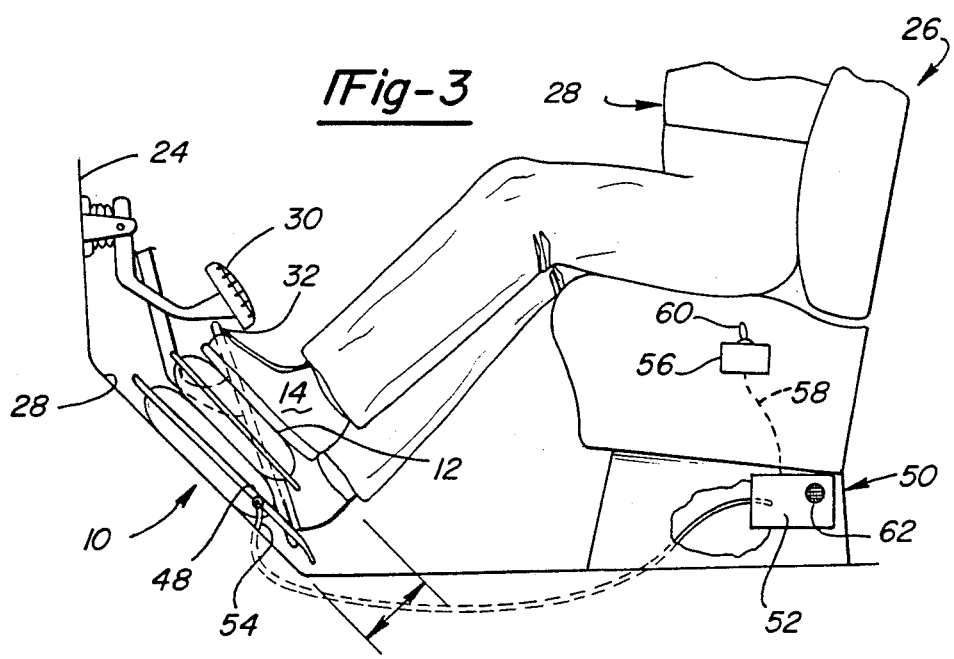

AUTOMOBILE FOOT REST

FIELD OF THE INVENTION

This invention relates generally to automobile foot rests and, more particularly, to an adjustable foot rest.

BACKGROUND OF THE INVENTION

The front seats of automobiles are mounted on the floor board upon which passengers normally rest their feet. The floor board adjacent an automobile front seat is normally flat and connects to an angled toe board adjacent the fire wall. The front seat passengers normally rest both feet on the toe board and the driver normally rests his left, or non-operating foot there.

To accommodate the driver's left foot, most vehicles include a foot pad mounted on the carpet surface to inhibit carpet wear. Some of these have, a complementary shoe sole shape, as depicted in U.S. Pat. No. 3,047,088 to Murrell. In some vehicles, a "dead" pedal is mounted for engagement by the driver's left foot.

Since vehicle drivers come in all sizes, including short and long-legged versions, attempts have been made to accommodate the extremes. Many vehicles have adjustable steering columns to enable short-legged drivers to move the seat forward to reach the control pedals.

Other adjustments include a movable toe board and pedals, as shown in U.S. Pat. No. 3,288,239 to Ristau, which uses an expensive and complex mechanism which is hydraulically operated. To help accommodate passengers, as well as drivers, adjustable foot rests have been proposed which mechanically interlock a movable foot rest for movement with a seat. An example of this is related in U.S. Pat. No. 3,059,960 to Komorowski. None of the arrangements proposed heretofore provide an inexpensive, unobtrusive, variably adjustable foot rest that harmonizes with vehicle interior styling.

SUMMARY OF THE INVENTION

It is an object of this invention to provide an effective and inexpensive variably adjustable foot rest for vehicle occupants which can operate in conjunction with or independent of seat movement. It is another object to provide a left foot rest for a vehicle driver which utilizes an available power source or manual power.

Accordingly, this invention provides an adjustable foot rest for an occupant of an automobile which has a floor board, comprising an inflatable chamber mounted on the floor board, a foot pad mounted on the chamber for engagement by the occupant's foot, and means for variably inflating the chamber to selectively position the foot pad. Preferably, the inflating means comprises a source of compressed air, air distribution means including a valve for selectively connecting the chamber to the source and to atmosphere, and control means controlling operation of the valve to selectively position the foot pad.

The inflatable chamber may be a flexible bladder having a plurality of chambers arranged in accordion fashion to enable substantially linear movement of the foot pad between extreme inflated and deflated positions. Where the floor board is covered with carpeting, the foot pad and chamber are imbedded in a carpet cutout for movement of the foot pad between a deflated position substantially flush with the carpet surface and a fully inflated position substantially displaced above the carpet surface.

Although a foot rest according to the invention is useful for all vehicle occupants, it is especially useful to provide a left foot rest for a vehicle driver to enable provision of a comfortable position for this foot for drivers of all sizes. The foot rest may be individually operated or the control means may be operatively connected to the power means to operate the valve and position the foot pad in coordination with movement of a seat.

A better understanding of this invention will be obtained by reference to the following detailed description of the invention which is illustrated in the accompanying drawings, in which:

DESCRIPTION OF THE DRAWINGS

FIG. 1 is a perspective view of a foot rest according to this invention, with the foot rest shown retracted;

FIG. 2 is a view similar to FIG. 1, but showing the foot rest extended;

FIG. 3 is a schematic view of an operating system for controlling inflation of the foot rest according to this invention;

DETAILED DESCRIPTION OF THE INVENTION

Figure 4:
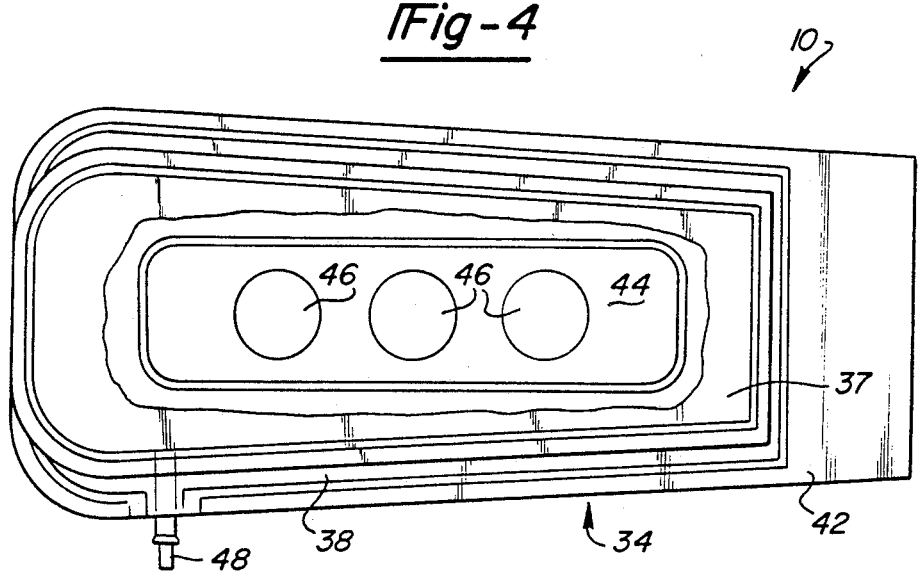
FIG. 4 is a plan view of an inflatable bladder for the foot rest according to this invention, partially broken away to show construction details.

Referring now to FIG. 1 of the drawings, an adjustable foot rest 10 of this invention comprises a foot pad 12 which is engageable by a vehicle occupant's foot 14 in a conventional manner. Foot pad 12 is mounted in a cutout 16 of the carpeting 18 covering the vehicle toe board portion 20 of the vehicle floor board 22 which extends to the vehicle fire wall 24.

As shown in FIG. 3, a seat 26 is provided on floor board 22 for occupancy by the vehicle driver 28. While this invention is useful for all vehicle occupants, it is particularly adapted for use by vehicle drivers as a foot rest for the left foot 14, as shown here. To accommodate drivers having different leg lengths and positioning preference relative to the vehicle control pedals 30, 32, foot pad 12 is mounted on an inflatable bladder 34 which is mounted within carpeting cutout 16 on toe board portion 20 of floor board 22.

Figure 5:
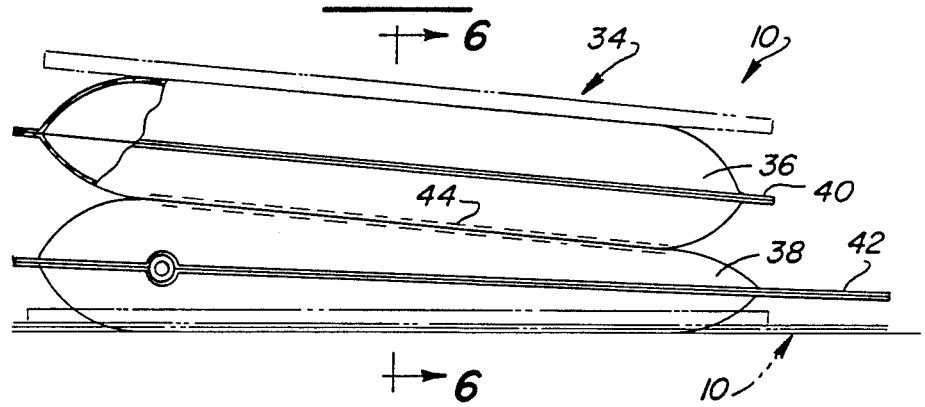
FIG. 5 is a side elevation of the bladder of FIG. 4.
Figure 6:
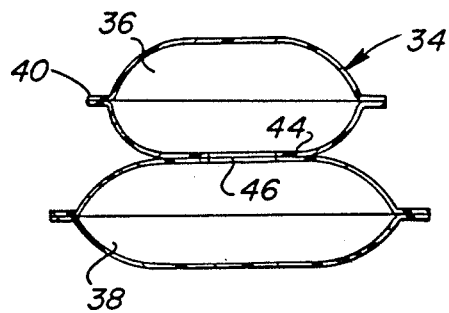
FIG. 6 is a sectional view, taken along lines 6-6 of FIG. 5.

Referring now to FIGS. 4-6, bladder 34 comprises two (or more) interconnected upper and lower chambers 36, 38 arranged in accordion fashion, having peripheral flanges 40, 42 which assure linearity of travel of foot pad 12 as it moves between the retracted position of FIG. 1 substantially flush with the surface of carpeting 18, and the fully extended position above carpet 18, a illustrated in FIG. 2, as the bladder is inflated. Bladder 34 is preferably of plastic and chambers 36, 38 are electronically seam welded about the periphery of an interface section 44, which includes holes 46 for fluid communication. Lower chamber 38 mounts a nipple 48 which is connected to an inflating means 50, as will now be described with reference to FIG. 3.

The inflating means 50 comprises a source of compressed air 52 which includes a conventional air pump, or compressor and conventional valving that is connected via a pneumatic conduit 54 to nipple 48 of bladder 34. The valving is controlled by a controller 56, connected thereto by a line 58, which has a switch 60 for selectively connecting conduit 54 to the pump, to inflate bladder 34, or to a vent 62 to atmosphere to deflate the bladder. In this manner, foot pad 12 may be extended or retracted at will to any comfortable position between fully extended (FIG. 2) and fully retracted (FIG. 1) by merely operating switch 60.

The maximum distance of extension of foot pad 12 is controlled by the inflatability of bladder 34. In a preferred form, the bladder is designed for a maximum inflatablity corresponding to a 100 mm. extension of foot pad 12 above the surface of carpeting 18. To assist in the return of foot pad 12 to the fully retracted FIG. 1 position, or to any intermediate position, upon deflation of bladder 34, the bladder preferably has an elastic memory in its fully deflated position. Alternatively, a light assist spring could be used to assure correct repositioning.

If it is desired to couple movement of foot pad 12 with fore-and-aft movement of seat 26, controller 56 may be incorporated in the corresponding seat positioning switch. Also contemplated is the ability of the vehicle occupant to select between automatic seat-controlled positioning and independent positioning.

The source of compressed air 52 could be a compressor that is conventionally fitted to some vehicles to control the suspension or to operate lumbar adjustment devices. Alternatively, an economy model could incorporate a small squeezeable bulb-type pump fitted with a valve/switch to control inflation/deflation.

In any event, this invention provides a simple, inexpensive, but effective adjustable foot rest that fits any interior styling scheme, since it can be placed at any convenient location due to its compact size.

I claim:

1. An adjustable foot rest for an occupant of an automobile which has a floor board, comprising an inflatable chamber mounted on the floor board, a foot pad mounted on the chamber for engagement by a passenger's foot, and means for variably inflating the chamber to selectively position the foot pad relative to the floor board.

2. The adjustable foot rest of claim 1, wherein the inflating means comprises a source of compressed air, air distribution means including a valve for selectively connecting the chamber to the source and to atmosphere, and control means controlling operation of the valve to selectively position the foot pad.

3. The adjustable foot rest of claim 2, wherein the inflatable chamber is a flexible bladder having a plurality of chambers arranged in accordion fashion to enable substantially linear movement of the foot pad between extreme inflated and deflated positions.

4. The adjustable foot rest of claim 3, wherein the floor board is covered with carpeting, and the foot pad and chamber are imbedded in a carpet cutout for movement of the foot pad between a deflated position substantially flush with the carpet surface and a fully inflated position substantially displaced above the carpet surface.

5. The adjustable foot rest of claim 3, including means biasing the bladder to deflated condition.

6. The adjustable foot rest of claim 5, wherein the bladder is made of a plastic having an elastic memory of the fully deflated position which comprises the biasing means.

7. The adjustable foot rest of claim 1, wherein the floor board is covered with carpeting, and the foot pad and chamber are imbedded in a carpet cutout for movement of the foot pad between a deflated position substantially flush with the carpet surface and a fully inflated position substantially displaced above the carpet surface.

8. The adjustable foot rest of claim 7, wherein the inflatable chamber is a flexible bladder having a plurality of chambers arranged in accordion fashion to enable substantially linear movement of the foot pad between extreme inflated and deflated positions.

9. The adjustable foot rest of claim 2, wherein the foot pad is located adjacent a vehicle passenger seat which is variably positioned by power means, and the control means are operatively connected to the power means to operate the valve and position the foot pad in coordination with seat movement.

10. The adjustable foot rest f claim 9, wherein the inflatable chamber is a flexible bladder having a plurality of chambers arranged in accordion fashion to enable substantially linear movement of the foot pad between extreme inflated and deflated positions.

11. The adjustable foot rest of claim 10, wherein the floor board is covered with carpeting, and the foot pad and chamber are imbedded in a carpet cutout for movement of the foot pad between a deflated position substantially flush with the carpet surface an a fully inflated position substantially displaced above the carpet surface.

12. An adjustable foot rest for the left foot of a driver of an automobile which has a carpeted floor board, comprising an inflatable chamber mounted in a cutout of the carpet, a floor pad mounted on top of the chamber, and means for variably inflating the chamber to selectively position the foot pad relative to the carpet.

13. The adjustable foot rest of claim 12, wherein the inflating mean comprises a source of compressed air, air distribution means including a valve for selectively connecting the chamber to the source and to atmosphere, and control means controlling operation of the valve to selectively position the foot pad.

14. The adjustable foot rest of claim 13, wherein the inflatable chamber is a flexible bladder having a plurality of chambers arranged in accordion fashion to enable substantially linear movement of the foot pad between extreme inflated and deflated positions.

15. The adjustable foot rest of claim 14, wherein the foot pad is located adjacent a vehicle occupant sea which is variably positioned by power means, and the control means are operatively connected to the power means to operate the valve and position the foot pad in coordination with seat movement.

* * * * *